US007025211B2

(12) United States Patent
Reinach et al.

(10) Patent No.: US 7,025,211 B2
(45) Date of Patent: Apr. 11, 2006

(54) DOUBLE PUSHER CENTRIFUGE

(75) Inventors: Harald Reinach, Remetschwiel (DE); Roy Geiger, Schafisheim (CH)

(73) Assignee: Ferrum AG, Rupperswil (CH)

( * ) Notice: Subject to any disclaimer, the term of this patent is extended or adjusted under 35 U.S.C. 154(b) by 0 days.

(21) Appl. No.: 10/819,055

(22) Filed: Apr. 5, 2004

(65) Prior Publication Data

US 2004/0206687 A1 Oct. 21, 2004

(30) Foreign Application Priority Data

Apr. 16, 2003 (EP) ................................ 03405272

(51) Int. Cl.
*B01D 33/46* (2006.01)
*B01D 33/06* (2006.01)
*B04B 3/02* (2006.01)

(52) U.S. Cl. ...................... 210/369; 210/372; 210/376; 210/489; 464/36

(58) Field of Classification Search ................ 210/359, 210/360.2, 369, 372, 373, 376, 488, 489; 494/36

See application file for complete search history.

(56) References Cited

U.S. PATENT DOCUMENTS

| | | | | |
|---|---|---|---|---|
| 2,720,981 | A | 10/1955 | Greenwall | |
| 3,092,580 | A * | 6/1963 | Irving | 210/376 |
| 3,268,083 | A | 8/1966 | Ruegg | |
| 3,368,684 | A | 2/1968 | Ruegg | |
| 3,395,807 | A * | 8/1968 | Fierstine | 210/376 |
| 3,463,316 | A * | 8/1969 | Fierstine | 210/781 |
| 5,356,366 | A * | 10/1994 | Stahl | 494/37 |
| 5,401,423 | A | 3/1995 | Leung et al. | |
| 2002/0030024 | A1* | 3/2002 | Leung et al. | 210/781 |
| 2004/0185999 | A1* | 9/2004 | Beyer et al. | 494/53 |

FOREIGN PATENT DOCUMENTS

| | | | |
|---|---|---|---|
| CH | 624858 | A5 | 8/1981 |
| DE | 2165719 | A | 7/1973 |
| DE | 19546019 | C1 | 2/1997 |
| DE | 19611129 | C1 | 7/1997 |
| EP | 0710504 | A1 | 5/1996 |
| GB | 918386 | A | 2/1963 |

* cited by examiner

*Primary Examiner*—Fred G. Prince
(74) *Attorney, Agent, or Firm*—Townsend and Townsend and Crew LLP

(57) ABSTRACT

The invention relates to a double pusher centrifuge including a screen drum (3) rotatable about an axis of rotation (2) for separating a mixture (4) into a solid material cake (5) and a liquid phase (6), a mixture distributor (7) arranged in the screen drum (3) and having a pusher base device (8), which is arranged to be movable to and fro along the axis of rotation (2), so that the solid material cake (5) is alternately displaceable with an outer ring zone (9). Furthermore, the double pusher centrifuge includes an infeed device (10) with which the mixture (4) can be introduced via the mixture distributor (7) into an empty space (11), which arises adjacent to the outer ring zone (9) on displacement of the solid material cake (5) by the pusher base device (8). In this arrangement the pusher base device (8) has acceleration surfaces (12) on both sides, which are inclined at a pre-determinable angle of inclination (γ) with reference to the radial direction, so that the mixture (4) introduced by the infeed device (10) can be accelerated to a pre-determinable peripheral speed before reaching the screen drum (3).

17 Claims, 13 Drawing Sheets

DOUBLE PUSHER CENTRIFUGE

BACKGROUND OF THE INVENTION

The invention relates to a double pusher centrifuge including a screen drum rotatable about an axis of rotation for separating a mixture into a solid material cake and a liquid phase, a mixture distributor arranged in the screen drum and having a pusher base device, which is arranged to be movable along the axis of rotation, so that the solid material cake is alternately displaceable with an outer ring zone, and with an infeed device with which the mixture can be introduced via the mixture distributor into an empty space, which forms adjacent to the outer ring zone on displacement of the solid material cake by the pusher base device.

Centrifuges in the most diverse designs for drying damp substances or damp mixtures of substances are very widely known and are employed in the most diverse fields. Thus for example discontinuously operating centrifuges, such as peeling centrifuges, are preferably used for drying high purity pharmaceutical products, whereas continuously operating pusher centrifuges are advantageously used in particular when large amounts of a congealed liquid mixture are to be separated continuously. In this context one-stage or multi-stage pusher centrifuges and also so-called double pusher centrifuges are used depending on the requirements.

In the different types of the last-named class of pusher centrifuges, a solid/liquid mixture, for example a suspension or a moist salt or salt mixture, is fed through an infeed tube via a mixture distributor of a rapidly rotating drum, which is designed as a filter screen, so that the liquid phase is separated through the filter screen due to the centrifugal forces that are operating while a solid material cake is deposited in the inside on the drum wall. In this arrangement a substantially disc-shaped synchronously co-rotating pusher base, which oscillates in the axial direction with a certain amplitude, is arranged in the rotating drum, so that one part of the dried solid material cake is pushed out at one end of the drum. In the opposite movement of the pusher base, an adjacent region of the drum is exposed, which can then be fed with a new mixture through the infeed tube and via the mixture distributor again. In this arrangement, depending on the type used, throughput amounts of the order of magnitude of 100 tons per hour can be achieved with modern high-performance pusher centrifuges, with drum diameters of up to 1000 mm and more being common. Typical rotational frequencies of the drum of up to 2,000 rotations per minute and more can be reached, depending on the drum diameter. As a rule a larger drum diameter implies a smaller maximum rotational frequency of the drum, due to the strong centrifugal force which occurs. The operating parameters, such as for example the rotation frequency of the drum, the amount of mixture added per unit of time or also the drum diameter, or the type of pusher centrifuge used, can also depend on the material to be dried, on the content of liquid, etc.

In the known double pusher centrifuges the mixture usually reaches the middle of the centrifugal drum via a stationary infeed tube and a mixture distributor, wherein the mixture distributor rotates in synchronism with the centrifuge drum. The mixture can be fed, in cooperation with the mixture distributor, alternately to the front or back drum half, by a pusher base arranged in the middle of the centrifuge drum, which oscillates along the longitudinal axis of the centrifuge drum and which can be operationally connected to the mixture distributor. As a result of this, two inflow zones are present, so that correspondingly large amounts of mixture can be processed per unit of time. In this arrangement, the solid material cake is transported by the pusher base to the respective end of the drum and carried out via a collecting channel.

A known double pusher centrifuge, which operates in accordance with the principle described above, is described in detail in EP 0 635 309 B1. The advantages over conventional one-stage or multi-stage pusher centrifuges are obvious. Among other things the double inflow zone is to be named, through which a clearly increased liquid swallowing capacity is achieved; i.e. it is possible to work with a higher liquid content. At the same time higher total feed amounts of mixture can be processed. Furthermore, the double solid material feed capacity is achieved for the same stroke number and thus a specifically lower transport power. In this arrangement the space requirements correspond to those of normal pusher centrifuges of the same constructional size.

Typical fields of operation for double pusher centrifuges are, among others, products which can be readily dewatered, such as sea salt for example, where in particular the double exploitation of the pusher movement comes into full effect. A further typical field of use is products which can be filtered poorly or mixtures with low inflow concentrations (i.e. with a high liquid content). Here the swallowing capacity which is high in comparison with usual pusher centrifuges has a particularly positive effect. Smaller inflow concentrations or higher suspension amounts can be processed without resulting in flooding.

However, known pusher centrifuges also display various grave disadvantages. Even if lower infeed concentrations can be processed with the known double pusher centrifuges than with usual one-stage or multi-stage pusher centrifuges, the infeed concentration of the mixture which is to be processed cannot be indefinitely small. I.e. if the proportion of liquid in the mixture is too high, for example amounting to 50% or 70% or 80% or even more than 90% liquid phase, the mixture has to be pre-thickened using more or less complicated processes. If the liquid content is too high a regular distribution of the mixture to be dried over the extent of the screen drum is increasingly difficult. On the one hand this can lead to extremely damaging vibrations of the screen drum and thus to premature wear and tear on the bearings and the drive; in the worst case it can even lead to a safety problem in operation. On the other hand, an irregular solid material cake distributed irregularly over the circumference of the screen drum can lead to problems during washing. For this reason, static thickeners, curved screens or the well-known hydrocyclones are available. It is obvious that the use of preliminary drying systems is very complicated to operate, both from the point of view of the technical process and the apparatus required, and is thus expensive.

A further grave disadvantage in the processing of mixtures of small infeed concentration is that practically the whole amount of liquid which is fed in with the mixture has to be accelerated to the full peripheral speed before it is separated out through the filter screen of the screen drum. The same applies to the smallest particles in the mixture which are likewise to be separated through the screen from the solid material cake. This is extremely undesirable from an energy point of view and has a clearly negative influence on the operating behavior of the centrifuge.

Even in the processing of mixtures with considerably higher solid material concentration some of the centrifuges known from the prior art show massive disadvantages. Thus the mixture introduced into the mixture distributor through the infeed tube is accelerated to the full peripheral speed of the drum in a very short time after reaching the screen drum. In particular, in the case of sensitive substances this can lead to granule breaking. This means, for example, that solid material granules which are distributed in a suspension which has been introduced to the centrifuge burst apart into smaller pieces in an uncontrolled manner during the abrupt acceleration process, which can have a negative influence on the quality of the solid material cake which has been produced, for example, if the particle size of the granules in the end product is important.

SUMMARY OF THE INVENTION

An object of the present invention is thus to propose an improved double pusher centrifuge which largely avoids the disadvantages known from the prior art.

The double pusher centrifuge in accordance with the invention relates to a screen drum rotatable about an axis of rotation for separating a mixture into a solid material cake and a liquid phase and also a mixture distributor arranged in the screen drum with a pusher base device which is arranged to be movable to and fro along the axis of rotation so that the solid material cake is alternately displaceable with an outer ring zone. The double pusher centrifuge further includes an infeed device with which the mixture can be introduced into an empty space, which arises adjacent to the outer ring zone on displacement of the solid material cake by the pusher base device. In this arrangement the pusher base device has acceleration surfaces on both sides which are inclined at a pre-determinable angle with reference to the radial direction so that the mixture introduced by the infeed device can be accelerated to a pre-determinable peripheral speed before reaching the screen drum.

Due to the fact that the pusher base device has acceleration surfaces inclined relative to the radial direction, the mixture introduced through the infeed device into the mixture distributor does not reach the screen drum directly. On the contrary the mixture which is pouring in is applied to the acceleration surfaces which are inclined relative to the radial direction. In this way a slowed down acceleration of the newly introduced mixture up to the peripheral speed of the screen drum is achieved. In this way granule breakage in particular and other damaging influences such as occur during abrupt acceleration in the double pusher centrifuges known from the prior art can be avoided. Thus a bursting open of the solid material granules contained in the mixture is avoidable through the double pusher centrifuge in accordance with the invention because the acceleration process is controllable via the pre-determinable angle of inclination of the acceleration surfaces. I.e. the acceleration itself can, for example, be regulated by means of a suitable selection of the angle of inclination of the acceleration surface. In this way the quality of the solid material cake produced can be clearly improved, in particular in the case of products in which for example the particle size or the shape of the granules in the end product are important. In special cases it is even possible to produce products of different qualities in one and the same double pusher centrifuge in one working operation, for example, by selecting a different angle of inclination of the acceleration surfaces arranged on both sides of the pusher base device.

The important components and also the basic method of operation of a double pusher centrifuge are known from the prior art so that in the following reference can primarily be made to the features central to the invention.

The double pusher centrifuge in accordance with the invention includes, in a manner known per se, a screen drum rotatable about a rotational axis via a drum axle, which is accommodated in a housing. The drum axle is connected in operation with a drum drive so that the screen drum can be rapidly rotated about the axis of rotation by the drum drive. In this arrangement the screen drum has screen apertures through which in known manner the liquid phase from a mixture which was applied to an inner peripheral surface of the screen drum can be led to the outside by the centrifugal forces which occur during fast rotation. The mixture which is applied to the inner peripheral surface of the screen drum is thus separated by the extremely strong prevailing centrifugal forces into a solid material cake which is deposited on the inner peripheral surface of the screen drum and into the liquid phase.

In an example, which is particularly important in practice, the screen drum can be designed in a manner known per se as a skeleton-like support drum, which is lined with special filter foil at its periphery for the formation of the corresponding screen surfaces; i.e. the skeleton-like screen drum can for example be equipped with one or more filter screens, with filter openings of the same or different sizes for the separation of the liquid phase.

A mixture distributor is arranged inside the screen drum which allows the mixture to distribute over the peripheral surface of the screen drum, with the mixture distributor including an infeed device and a pusher base device with pusher base plate.

In the operating condition the mixture reaches the inlet device via the infeed device and can be fed in known manner alternately to the front or back half of the screen drum, as a result of an oscillating movement of the pusher base device. In this arrangement, in a preferred embodiment, the inlet device is rigidly coupled to the screen drum and thus rotates in synchronism with the screen drum and the mixture distributor. The oscillatory movement is only executed by the mixture distributor with its components however, i.e. with the pusher base plate, the connecting element, the pusher base device and the outer ring zone. Thus, in the operating state, an oscillatory relative movement arises between the oscillating mixture distributor and the inlet device which is immovable in the axial direction, so that the mixture can be fed alternately to the front or the back half of the screen drum.

The pusher base device which can be operationally connected to the pusher base plate in a special embodiment is preferably designed in the form of a circular disc with an outer ring zone, with the ring zone being so designed and arranged at a peripheral region of the pusher base device that the solid material cake deposited in the screen drum can be displaced alternately in both directions of the rotational axis with the ring zone.

In a manner known per se, the pusher base plate is coupled to a pusher device with change-over unit by means of a pusher axle so that the pusher base device can be set into an oscillating movement with pre-determinable stroke in the direction of the rotational axis in an oscillatory movement. By means of the oscillatory movement of the pusher base device the solid material cake deposited on the peripheral surface of the screen drum can be displaced through the outer ring zone alternately in both directions of the rotational axis so that the solid material cake can be transported by the outer ring zone in the axial direction to the respective end of the screen drum and can be led away via a discharge opening out of the double pusher centrifuge, separate from the liquid phase.

In this arrangement it is important for the invention that the pusher base device is so designed in a pre-determined region in the form of acceleration surfaces that the mixture which has been brought in by the infeed device can be accelerated to a pre-determinable peripheral speed before reaching the screen drum.

For this purpose the mixture from the infeed device is alternately fed to one side of the pusher base device respectively. If the mixture in the infeed device cannot already be pre-accelerated to a pre-determined peripheral speed, the mixture reaches a corresponding surface of the pusher base device, essentially due to the effects of gravity, and finally reaches the acceleration surface inclined at a pre-determined angle of inclination relative to the radial direction. The mixture flows over or along the acceleration surfaces and thus reaches the peripheral surface of the screen drum. Here the mixture flows into the empty space formed on the peripheral surface of the screen drum by the oscillating movement of the pusher base device and is accelerated to the rotational speed of the screen drum. The liquid phase contained in the mixture is drained out of the screen drum through the screen openings by the enormous centrifugal forces which act on the mixture deposited in the empty space.

Due to the fact that the acceleration surface is inclined relative to the radial direction the flow speed in the region of the acceleration surface can be selectively altered in comparison with the speed in free-fall of the mixture in the direction towards the peripheral surface, so that the mixture in the region of the acceleration surfaces can be gradually accelerated with increasing proximity to the outer ring zone. This means that the mixture can be accelerated gradually bit by bit in a particularly gentle manner to a pre-determinable speed in the region of the acceleration surfaces of the double pusher centrifuge in accordance with the invention, in order to then finally attain the full rotational speed of the screen drum on reaching the peripheral surface.

The value of the angle of inclination of the acceleration surface relative to the radial direction can then, for example, lie between 0° and 90°, in the individual case between 10° and 30° or between 30° and 60°, in particular between 60° and 70°, preferably however between 55° and 75°. It goes without saying that it is also specifically possible that the value of the angle of inclination can be larger than 70° and can even lie close to 90°. It can be ascertained quite generally that as a rule, with reference to the radial direction, a not too acute angle is of advantage, whereas an optimum value of the corresponding angle of inclination is determined among other things by the value of the adhesive friction angle of the product to be dewatered.

In this arrangement the acceleration surfaces can either extend over a part region of the pusher base device or however also over the whole radial height of the pusher base device, wherein the pusher base device can be constructed, depending on the requirements, completely or partially as an essentially hollow frame or wholly or partially out of solid material. It is of course also possible for the two acceleration surfaces to have the same or different angles of inclination.

In an embodiment of a double pusher centrifuge in accordance with the invention which is particularly relevant in practice, the acceleration surface is designed as a filter screen for separating the liquid phase from the mixture. It goes without saying that only one acceleration surface can also be designed as a filter screen or the two acceleration surfaces can respectively have differently designed filter screens. In this arrangement the two different filter screens can for example be made of different materials or the size of the filter pores can be different. This makes it possible to produce two different solid material cakes of different qualities, i.e. with different characteristics from the same mixture in one and the same working step.

In particular, in an embodiment which is particularly important in practice, the acceleration surface can be arranged as a filter screen on a skeleton-like support body, which can be equipped with special filter foils for the formation of the filter screen; i.e. the skeleton-like support body can, for example, be equipped with one or more filter screens, which may have filter apertures of different sizes for separation in different stages.

At the same time gap screens or sheet metal screens among other things can be considered quite generally as filter screens. The filter screens can be advantageously provided with filter openings of different sizes in different ways. In particular, the aforementioned sheet metal screens can be perforated, drilled, lasered, perforated with electron beams or cut with water jets among other things. Other techniques can fundamentally also be considered. In this arrangement the screens themselves can be manufactured of different, in particular corrosion-proof, materials, such as for example plastic, composite materials or different steels such as 1.4462, 1.4539 or 2.4602 or other suitable materials. Furthermore, as a protection against wear, the filter screens can be provided with suitable layers, for example with hard chrome layers, tungsten carbide (WC), ceramics or otherwise hardened. The thickness of the filter sheets typically amounts to 0.2 mm to 5 mm—clearly different sheet thicknesses are also possible.

For the processing of particularly sensitive mixtures in particular, the infeed device can include an inlet funnel for pre-accelerating the mixture. In this way the mixture can already be pre-accelerated to a pre-determined speed of rotation before it is fed into the mixture distributor and can thus be treated even more gently. In this arrangement the speed of rotation to which the mixture can be pre-accelerated in the inlet funnel is for example pre-determinable by selecting the size and/or the opening angle of the inlet funnel.

In this arrangement the inlet funnel can also be rotatably arranged around a separate drive axis independent of the mixture distributor and rotatably designed and arranged by means of a drive with a pre-determinable speed of rotation about the drive axis. In this way the pre-acceleration can be selected freely, independent of the geometry of the inlet funnel, by the regulation of the speed of rotation of the drive. Suitable apparatuses for control and/or regulation can be provided in particular, so that the speed of rotation is also freely variable during operation for example. Thus, during operation, the quality of the solid material cake can be adapted for example or a different product quality can be manufactured from a mixture by suitable control and/or regulation of the speed of rotation of the drive, and thus of the inlet funnel, to the right and to the left of the pusher base device respectively, into one and the same double pusher centrifuge.

The inlet funnel can also be designed advantageously as a pre-filter screen for pre-separation of the liquid phase from the mixture, with collecting means preferably being provided for collecting and draining the liquid phase out of the pre-filter screen. In this way even mixtures with a very high liquid ratio can be processed without any problems. Moreover, the initial separation of the liquid phase in the inlet funnel has the enormous advantage that this part of the liquid phase is no longer accelerated to the very high speed of rotation of the screen drum which, among other things, has a particularly favorable effect on the energy consumption of the double pusher centrifuge.

In this arrangement not only the filter screen of the acceleration surfaces but also the pre-filter screen is designed as a two-stage screen with a coarse filter and a fine filter. In this way the mixture can be filtered in the region of the acceleration surface and/or in the inlet funnel in two stages. In this arrangement, the first filter stage forms a coarse filter which holds back particles contained in the mixture which are larger than the filter apertures/pores of the coarse filter. The fine filter retains correspondingly finer particles while at least one part of the liquid phase and also very small particles which also have to be removed can be drained directly. The design as a two-stage screen has the particular advantage that the fine filter is not subject to such a heavy mechanical load by large and/or heavy particles which are contained in the mixture which is running in, so that the fine filter can have very small pores for filtering very small particles for example and in particular also can be manufactured out of mechanically less resistant materials.

In another variant of the double pusher centrifuge in accordance with the invention the mixture distributor includes a pre-acceleration funnel which essentially diverges in the direction towards the infeed device.

In this arrangement the value of the pre-acceleration angle of the inlet funnel and/or the value of the pre-acceleration angle of the pre-acceleration funnel can be between 0° and 45° with reference to the axis of rotation, in particular between 0° and 10° or between 10° and 45°, in particular between 25° and 45°, preferably between 15° and 35°. It goes without saying that in special cases it is also possible that the value of the opening angle and/or the pre-acceleration angle is larger than 45°. In general it can be ascertained that as a rule a rather more acute angle with reference to the axis of rotation is of advantage, with an ideal value of the corresponding opening angle and/or the pre-acceleration angle being determined, among other things, by the value of the static friction angle of the product which is to be dewatered.

In this arrangement the pre-acceleration funnel can also be designed analogously to the inlet funnel as a pre-acceleration screen, whereby collection means can be provided on the mixture distributor for draining the liquid phase.

In a special embodiment which is particularly important in practice, the inlet funnel and/or the pre-acceleration funnel can be designed as skeleton-like support bodies which can be equipped with special filter foils for the formation of the pre-filter screen and/or of the pre-acceleration screen; i.e. the skeleton-like support body can for example be equipped with one or more filter screens which may have differently-sized filter apertures for separating in different stages.

In this arrangement in general gap screens or sheet metal screens among other things can be used as filter screens. The filter screens can be provided to advantage in different ways with filter apertures of different sizes. In particular, the previously named screen sheets can be stamped, drilled, lasered, perforated with electrons or cut with a water jet, although basically other techniques can be used as well. Depending on the requirements, the screens themselves can also be manufactured from various materials, in particular corrosion-resistant materials, such as, for example, plastic, composite materials, or different steels such as 1.4462, 1.4539, 2.4602, or from other suitable materials.

As a protection against wear, the filter screens can, furthermore, be provided with suitable layers, and can be hardened for example with hard chrome layers, tungsten carbide (WC), ceramics or otherwise. The thickness of the filter sheets typically amounts to 0.2 mm to 5 mm, but clearly different sheet thicknesses are also possible.

In particular, the pre-acceleration funnel can also be so designed and arranged that it can be rotated by means of a rotary drive about a rotary axis with a pre-determinable speed of rotation.

In this arrangement not only the inlet funnel but also the pre-acceleration funnel preferably extends at an essentially constant opening angle in the direction towards the pusher base device or towards the infeed device. The value of the pre-acceleration angle of the pre-acceleration funnel in relation to the rotary axis can be between 0° and 45°, individually between 0° and 10° or between 10° and 45°, in particular between 25° and 45°, preferably between 15° and 35°. It is of course in special cases also possible for the value of the pre-acceleration angle to be greater than 45°. It can generally be ascertained that, as a rule, a rather more acute angle is of advantage with reference to the rotary axis. An ideal value of the corresponding pre-acceleration angle is determined, among other things, by the value of the adhesive friction angle of the product to be de-watered.

For special uses the inlet funnel and/or the pre-acceleration funnel can however also have a curved shape in a pre-determinable region, and the opening angle of the inlet funnel and/or the pre-acceleration angle of the pre-acceleration funnel can become larger or smaller, for example in dependence on the characteristics of the mixture which is to be de-watered.

If the inlet funnel is formed as a pre-filter screen for initial separation of the liquid phase, then it can in particular be of particular advantage, but not only then, if the inlet funnel has a curved shape and the pre-acceleration angle of the inlet funnel becomes larger or smaller in the direction towards the pusher base device. It is known that under otherwise identical operation conditions of the double pusher centrifuge, for example depending on the grain size and/or the viscosity and/or other characteristics or parameters, such as for example the temperature of the mixture, different products can be de-watered with varying degrees of efficiency.

For example, if there is a mixture which under given operating parameters is relatively easy to de-water, it can be to advantage that the inlet funnel or the pre-filter screen has a curved shape, with the opening angle of the pre-filter screen becoming larger in the direction of the pusher base device, like the horn of a trumpet. Thus the output power with which the mixture is accelerated out of the inlet funnel becomes disproportionately larger as the distance from the pusher base device becomes smaller, so that the mixture, which can already be relatively strongly de-watered in the pre-filter screen and thus shows poor sliding properties in the pre-filter screen, can leave the pre-filter screen more rapidly than, for example, in the case of an essentially conical pre-filter screen which diverges with a constant opening angle.

On the other hand, mixtures can also be present which are relatively difficult to de-water with given operating parameters. In this case it is recommended to use an inlet funnel or a pre-filter screen with a curved shape, wherein the opening angle of the pre-filter screen becomes smaller in the direction of the pusher base device. The consequence of this is that the output drive power, with which the mixture is accelerated out of the inlet funnel, increases more slowly at a decreasing distance from the pusher base device than, for example, an inlet funnel which widens conically at an essentially constant opening angle. As a result a certain stagnation effect occurs in the pre-acceleration screen so that the mixture remains in the pre-filter screen for a longer time and thus can already be de-watered to a greater extent in the pre-filter screen.

Analogue to the above the pre-acceleration funnel can also have a curved shape, with the pre-acceleration angle of the pre-acceleration funnel becoming larger or smaller in the direction towards the infeed device.

The advantages associated with the curved inlet funnel and its method of operation explained above can be applied to a curved pre-acceleration funnel by the person skilled in the art without any problem and thus do not have to be repeated here.

It goes without saying that the characteristics of the particularly preferred embodiments of the double pusher centrifuge of the invention as explained in the above, by way of example, can be combined in any desired way in an advantageous manner, depending on the requirement.

The invention is explained more closely in the following on the basis of the schematic drawings.

DESCRIPTION OF THE PREFERRED EMBODIMENTS

Figure 1:
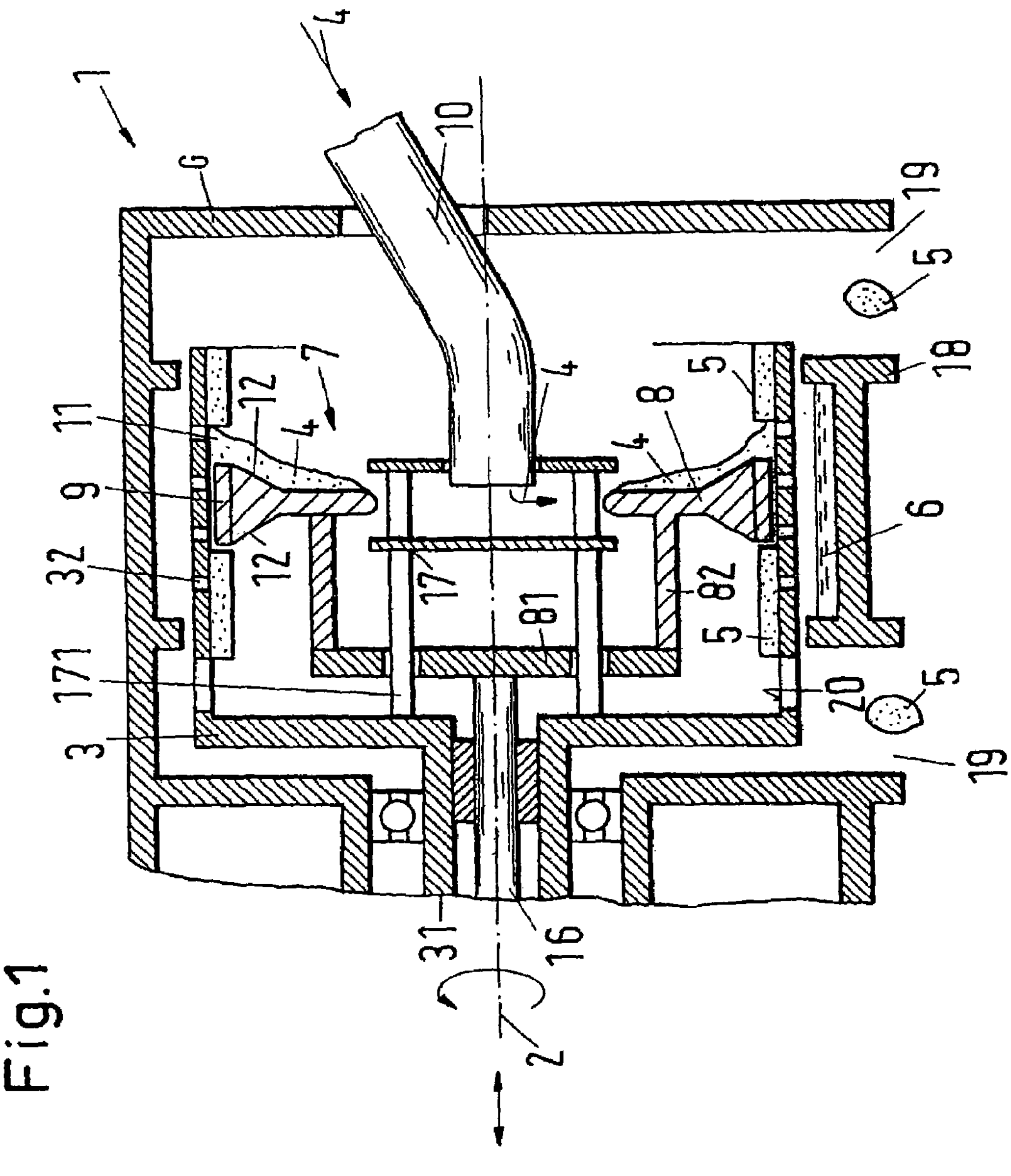
FIG. 1 is a section through a double pusher centrifuge in accordance with the invention with acceleration surfaces.

FIG. 1 shows in section, in a schematic illustration, the essential components of a double pusher centrifuge in accordance with the invention. The double pusher centrifuge in accordance with the invention, which will be given the reference numeral 1 in the whole of the following, includes, in a manner known per se, a screen drum 3 which is rotatable about an axis of rotation 2 via a drum axle 31, which is housed in a housing G. The drum axle 31 is actively connected with a not shown drum drive so that the screen drum 3 can be put into fast rotation about the axis of rotation 2. The screen drum has screen apertures 32 through which, in known manner and on fast rotation, liquid phase 6 can be drained out of a mixture 4, which was deposited onto an inner peripheral surface 20 of the screen drum 3, by means of the centrifugal forces which occur, to the outside into a collection means 18. The mixture 4 deposited on the inner peripheral surface 20 of the screen drum 3 is thus separated by the prevailing very strong centrifugal forces into a solid material cake, which is deposited on the inner peripheral surface 20 of the screen drum 3, and into the liquid phase 2, which can be drained through the screen apertures 32 out of the screen drum 3.

A mixture distributor 7 is arranged inside the screen drum 3 which enables the mixture 4 to distribute itself over the inner peripheral surface 20 of the screen drum 3, with the mixture distributor 7 including an inflow device 17 and a pusher base device 8 with a pusher base plate 81.

In the operating state the mixture 4 flows into the inflow device 17 via the infeed device 10 and can then be directed alternately to the front or rear half of the screen drum 3 due to an oscillatory movement of the pusher base device 8. The inflow device 17 is preferably rigidly coupled to the screen drum 3 by means of attachment means 171 and therefore rotates in a synchronized manner with the screen drum 3 and the mixture distributor 7. The oscillatory movement which will be explained in more detail below is carried out however only by the mixture distributor 7 with its components, i.e. with the pusher base plate 81, the connecting element 82, the pusher base device 8 and the outer ring zone 9. Thus, in the operating state, an oscillatory relative movement occurs between the oscillating mixture distributor 7 or the inflow device 17 which is immovable in the axial direction and the infeed device 10 which is immovable in the axial direction, so that the mixture 4 can be fed alternately to the front or the back half of the screen drum 3.

The pusher base device 8 is operatively fixedly connected to the pusher base plate 81 by means of a connection element 82. The pusher base device 8 is preferably formed in the form of a circular disc with an outer ring zone 9, with the ring zone 9 being so designed and arranged at a peripheral zone of the pusher base device 8 that the solid material cake 5 deposited in the screen drum 3 can be displaced with the ring zone 9 alternately in both directions of the axis of rotation 2. The pusher base plate 81 is likewise preferably formed as a ring disc 81, but can however also be developed in the form of a spoked wheel 81 or in any other suitable form. The connecting means 82 which operatively fixedly connects the pusher base plate 81 to the pusher base device 8 can for example be constructed from a plurality of struts which preferably, but not necessarily, extend along the axis of rotation 2, or can be designed as a compact or not compact drum 82, for example as a perforated drum 82 or in any other suitable form.

The pusher base plate 81 is coupled at a not shown pusher device with a reversing unit by means of a pusher axle 16, so that the pusher base plate 81 can be displaced by the connecting element 82 and the pusher base device 8 in the direction of the axis of rotation 2 in an oscillatory movement with a pre-determinable stroke. By means of the oscillatory movement of the pusher base device 8 the solid material cake 5 deposited on the peripheral surface of the screen drum 3 is displaceable by the outer ring zone 9, alternately in both directions of the axis of rotation 2, so that the solid material cake can be transported by the outer ring zone 9 in the axial direction to the respective end of the screen drum and can be drained via a discharge opening 19 out of the double pusher centrifuge 1 after having been separated from the liquid phase 6.

In this arrangement it is important for the invention that the pusher base device 8 is so designed in a pre-determinable region in the form of acceleration surfaces 12 that the mixture 4, introduced by the infeed device 10, can be accelerated to a pre-determinable peripheral speed prior to reaching the screen drum 3.

Figure 1A:
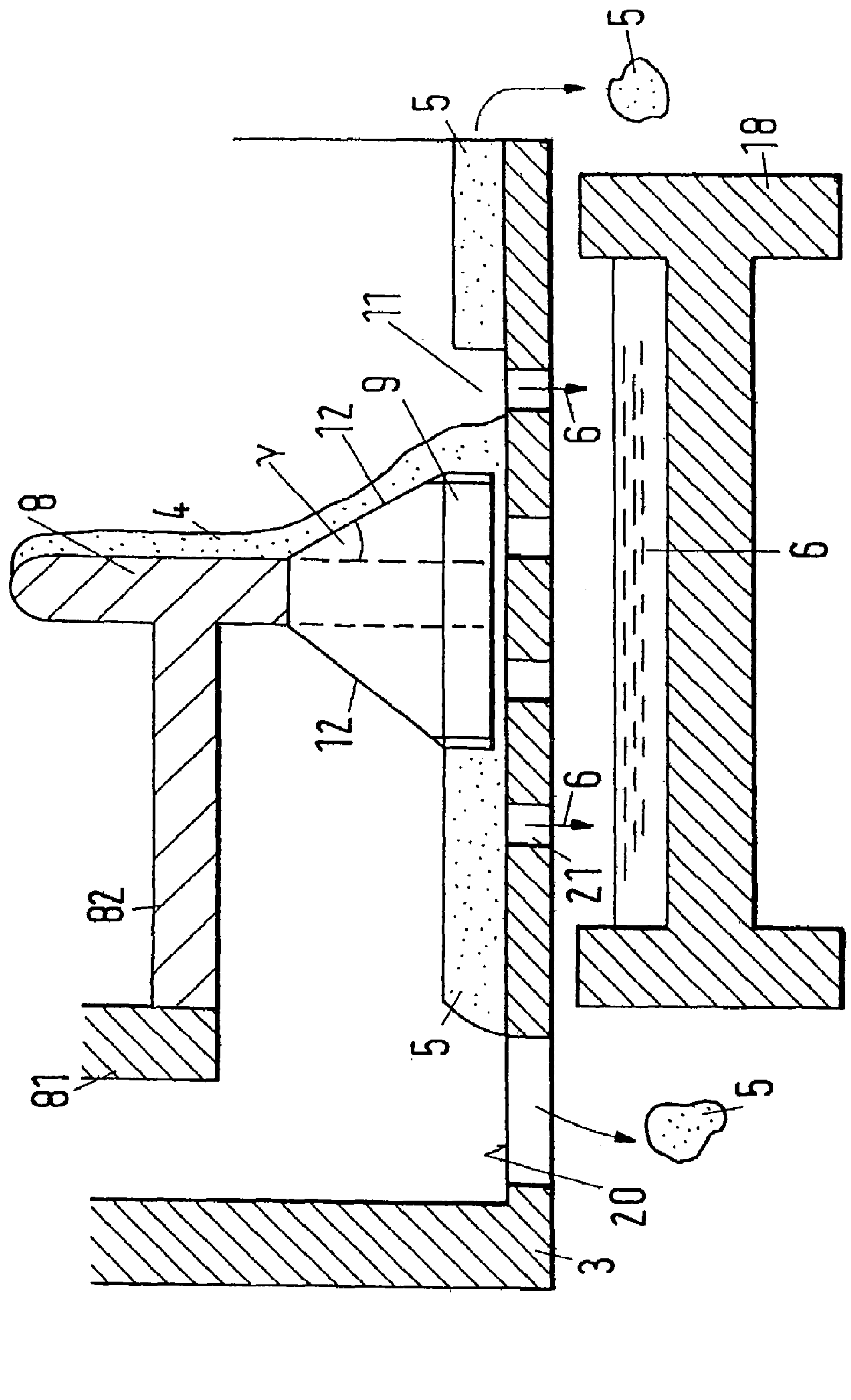
FIG. 1*a* is a section of the pusher base device with acceleration surfaces and an outer ring zone.

FIG. 1*a* shows in a schematic illustration a section of the pusher base device 8 with acceleration surfaces 12 and the outer ring zone 9. In the embodiment shown in FIG. 1*a*, the mixture 4 is fed out of an infeed device 10 not shown here, to the right-hand side of the pusher base device 8 in accordance with the drawing. The mixture 4 reaches a corresponding surface of the pusher base device 8, essentially under the effects of gravity, and finally reaches the acceleration surface 12 inclined at an angle of inclination $\gamma$ with reference to the radial direction. The mixture 4 flows over or along the acceleration surface 12 and thus reaches the peripheral surface 20 of the screen drum 3. Here the mixture flows into the empty space 11, formed by the oscillatory movement of the pusher base device 8, at the peripheral surface 20 of the screen drum 3 and is accelerated to the speed of rotation of the screen drum. The liquid phase 6 contained in the mixture 4 is drained out of the screen drum 3 through the screen openings 21 by the enormously high centrifugal forces which are working on the mixture 4 which has been deposited in the empty space 11.

Since the acceleration surface 12 is inclined at the angle of inclination $\gamma$ relative to the radial direction, the flow speed can be specifically altered in the direction towards the peripheral surface 20 in the region of the acceleration surface 12, in comparison to the speed in case of the free-fall of the mixture, so that the mixture 4 can be accelerated gradually in the region of the acceleration surfaces 12 with increasing proximity to the outer ring zone 9. This means that in the region of the acceleration surfaces 12 the mixture is accelerated in a particularly gentle manner to gradually reach a pre-determined peripheral speed, in order to then finally attain the full speed of rotation of the screen drum 3 on reaching the peripheral surface 20.

In this arrangement the acceleration surfaces 12 can either only extend over a part region of the pusher base device 8, as shown schematically in FIG. 1*a*, or, however, also extend over the total radial height of the pusher base device 8, with the pusher base device 8 being constructed wholly or partially as an essentially hollow frame 8 or wholly or partially out of solid material, depending on the requirements.

Figure 1B:
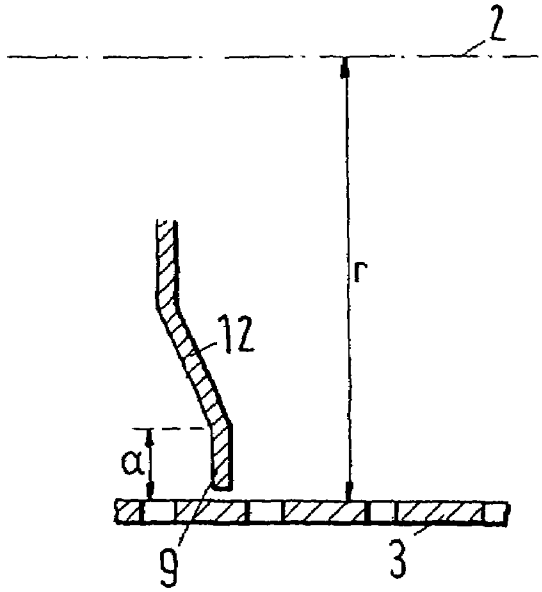
FIG. 1*b* shows an embodiment of an acceleration surface.

In FIG. 1*b* a special embodiment is shown in sections of an acceleration surface 12 with an outer ring zone 9 for displacing the solid material cake 5 which is not shown here. The outer ring zone 9 has in this case a pre-determined height a which, depending on the mixture 4 to be processed and/or the operating conditions under which the double pusher centrifuge 1 in accordance with the invention is operated, amounts to approximately 1% to 40% of the drum radius r, preferably approximately 5% to 10%, in particular 5% to 20% of the drum radius r.

Figure 1C:
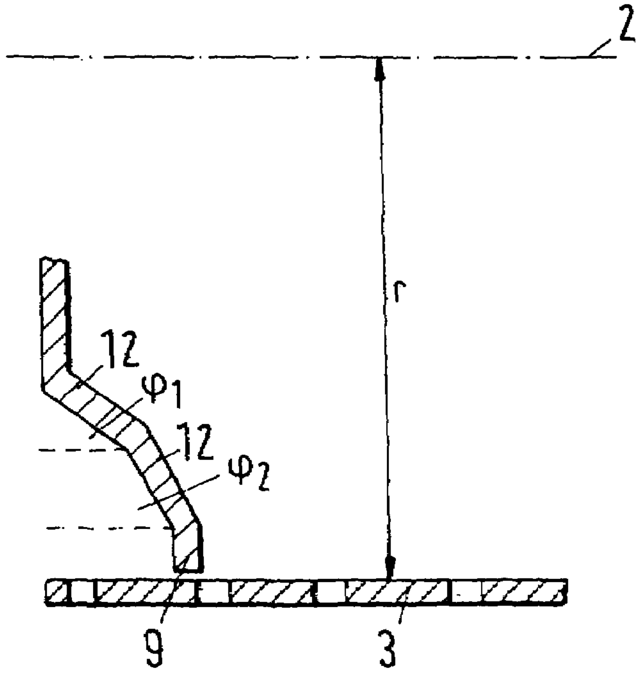
FIG. 1*c* shows a second embodiment in accordance with FIG. 1*b;*

In this arrangement, as schematically illustrated in FIG. 1*c*, the acceleration surface 12 can also be designed as a multi-stage acceleration surface 12, wherein the acceleration surface 12 can have a plurality of part surfaces inclined towards each other at different angles $\phi 1$, $\phi 2$, whereby the relative size of the part surface and also its surface angle $\phi 1$, $\phi 2$ can depend for example on the mixture 4 to be processed or on the operating parameters of the double pusher centrifuge 1.

Due to the fact that, in contrast to the double pusher centrifuges known from the prior art, the screen drum 3 is not accelerated abruptly in the region of the acceleration surfaces, i.e. in the shortest time possible, to the full speed of rotation in the region of acceleration surfaces, particle breakage and other damaging effects to the mixture 4 are preventable. Thus materials, in particular also materials which are very sensitive mechanically, can also be processed at high speeds of rotation of the screen drum 3 in the double pusher centrifuge 1 in accordance with the invention.

Figure 2:
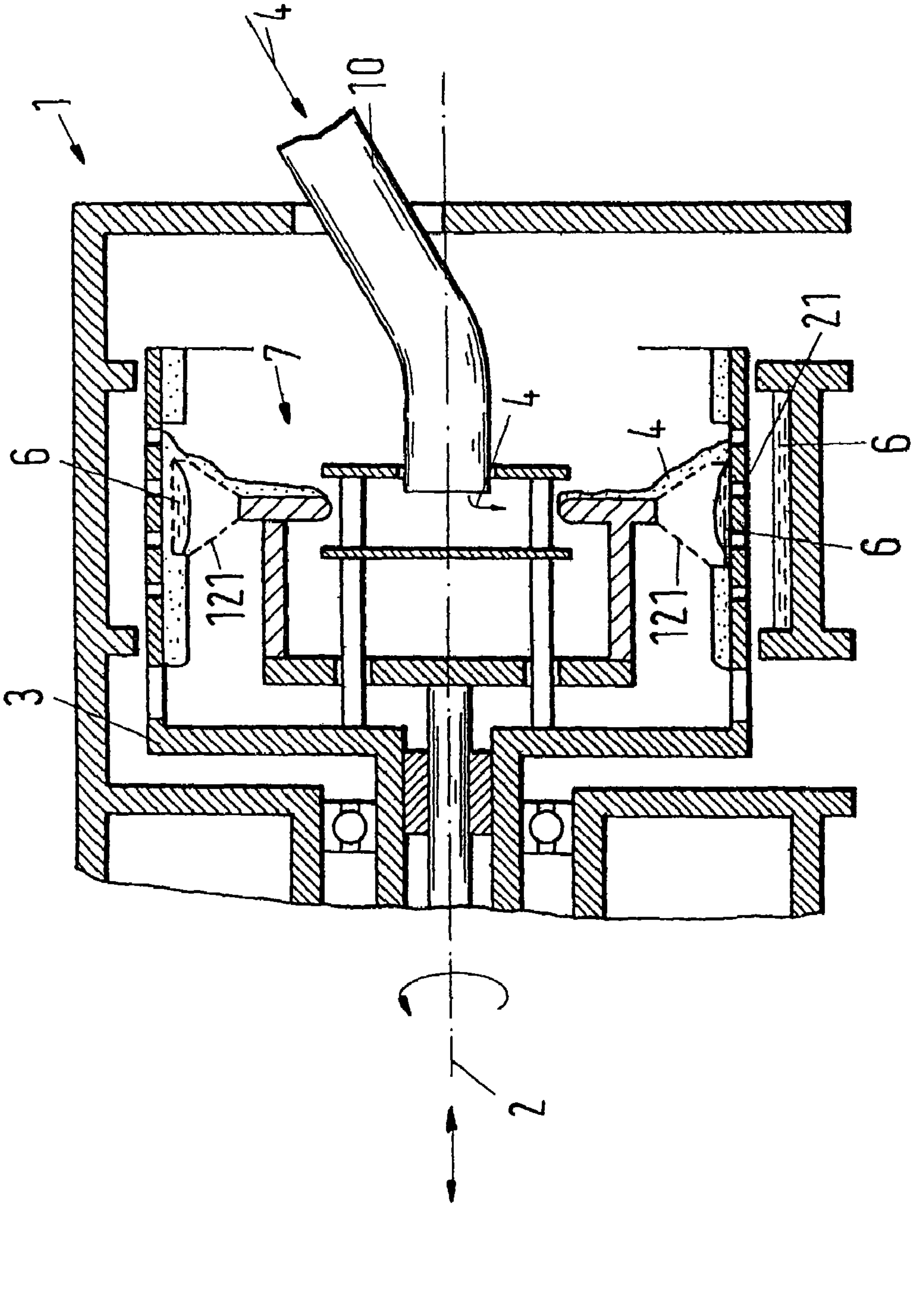
FIG. 2 shows a specific embodiment of a double pusher centrifuge in accordance with the invention with a filter screen.

FIG. 2 shows a preferred embodiment of a double pusher centrifuge 1 in accordance with the invention, in which the acceleration surface 12 is formed as a filter screen 121 for separating the liquid phase 6 out of the mixture 4. In this arrangement the pusher base device 8 is designed at least partially as a hollow body, at least in the region of the acceleration surfaces 12. In this way a part of the liquid phase 6 can already be separated while it is sliding across the acceleration surface 12 and is being pre-accelerated and can be drained through a screen opening 21 out of the screen drum 3. Thus mixtures 4 with a very high liquid content can also be processed without any problems. In particular, with a very high liquid content an even distribution of the mixture 4 to be dried over the peripheral surface 20 of the screen drum is always guaranteed. In particular, even with very high liquid concentrations in the mixture 4, additional devices for pre-dewatering, such as for example static thickeners, arched screens or hydrocyclones, are superfluous. In this arrangement even the smallest particles contained in the mixture 4 can be separated from the solid material cake 5 much more effectively by the effect of the pre-filtering.

Figure 2A:
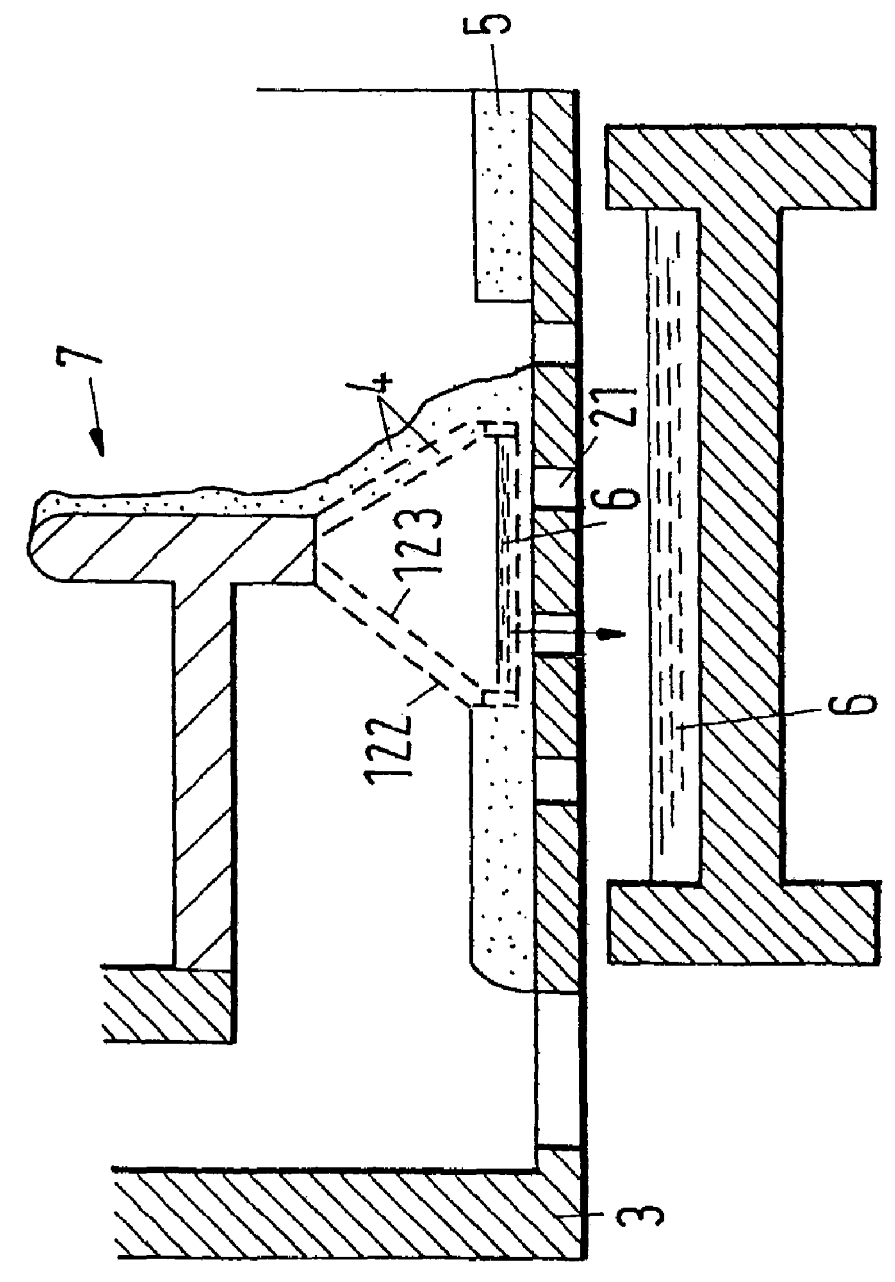
FIG. 2*a* shows another specific embodiment in accordance with FIG. 2 with a two-stage screen.

In FIG. 2*a* another embodiment in accordance with FIG. 2 is illustrated, in which the filter screen 121 is designed as a two-stage screen with a coarse filter 122 and a fine filter 123. In this way the mixture 4 can be filtered in two stages in the region of the acceleration surface 12. The first filter stage forms the coarse filter 122, which retains particles contained in the mixture which are larger than the filter openings of the coarse filter 122 which can thus be brought directly into the empty space 11. The fine filter retains correspondingly finer particles, which can likewise be fed to the empty space 11 and thus to the solid material cake 5, while at least one part of the liquid phase 6, and also very small particles which must likewise be removed, can be removed directly through the screen opening 21 out of the screen drum 3. The design of the filter screen 121 as a two-stage screen has the particular advantage that the fine filter 123 is not mechanically so polluted by large and/or heavy particles, which are contained in the mixture 4 which is flowing in, so that the fine filter 123 can, for example, have very small pores for filtering very small particles and in particular can also be manufactured from materials which are less resistant mechanically.

Figure 3:
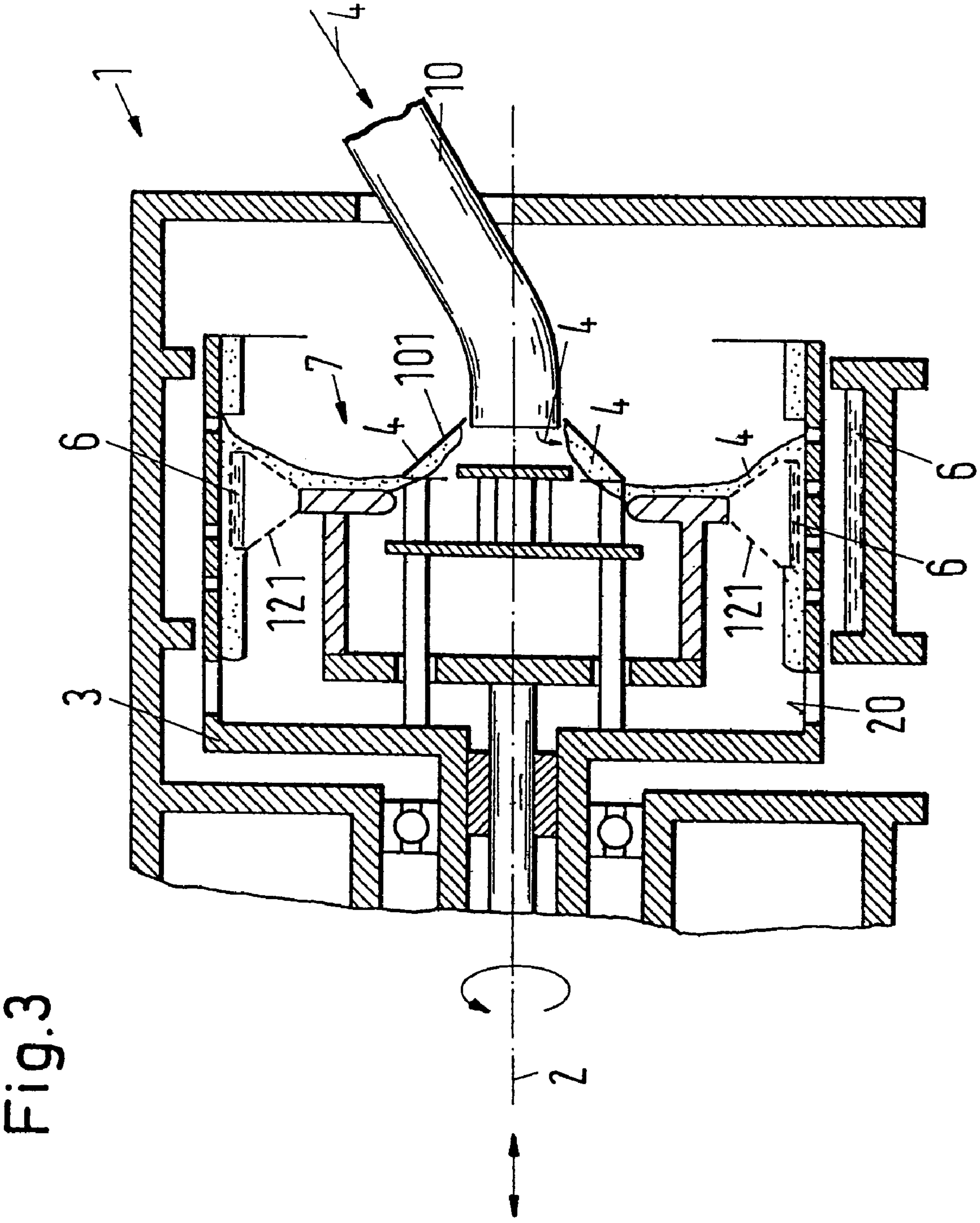
FIG. 3 shows a further specific embodiment with an inlet funnel.

FIG. 3 shows a further embodiment of a double pusher centrifuge 1 in accordance with the invention. In this embodiment the infeed device 10 includes an inlet funnel 101 for pre-acceleration of the mixture 4. The mixture initially flows through the inflow device which, as illustrated as an example in FIG. 3, includes an inlet tube into an inflow funnel 101 which is rotationally fixedly connected to the inflow device 17 so that the inflow funnel 101 rotates in synchronization with the pusher base device 8. In this arrangement the inflow funnel 101 extends in an essentially axial direction towards the infeed device 10, so that the mixture 4 supplied through the infeed device 10 flows directly into the inlet funnel 101. In this arrangement the inlet funnel is so designed and arranged that on flowing out of the inlet funnel 101, the mixture 4 can be fed into one of the two drum halves via the pusher base device, depending on the axial position of the mixture distributor 7.

Due to the fact that the inlet funnel 101 extends essentially conically diverging in the direction of the mixture distributor 7 and the fact that the inlet funnel co-rotates synchronically, the mixture 4 is initially pre-accelerated to a pre-determinable speed of rotation so that the mixture 4 already has a certain speed in the peripheral direction of the screen drum 3 on reaching the acceleration surface 12 and thus can be accelerated more gently as a whole to the maximum peripheral speed of the peripheral surface 20. In this arrangement the acceleration surface 12, as shown in FIG. 3, is preferably but not necessarily designed as a filter screen 121.

It can in practice be to advantage to specifically control the acceleration process itself or the speed of rotation to which the mixture can be accelerated in the inlet funnel 10. This can be achieved for example with the other variant in accordance with FIG. 3, shown in FIG. 4. In the variant according to FIG. 4 the inlet funnel 101 is substantially decoupled mechanically from the inflow device 17. For control and/or regulation of the speed of rotation of the inflow funnel 101, this is rotationally fixedly connected to a separate drive axle 131 and can be driven via the drive axle 131 by means of a drive 13 independent of the screen drum 3 with a pre-determinable rotational frequency. In this arrangement suitable means, not illustrated here however, can be provided in order to control and/or to regulate the drive 13 for example in dependence on suitable operating parameters of the double pusher centrifuge 1. Additionally, the double pusher centrifuge in accordance with the invention can also include corresponding sensors, not shown here, for measuring relevant operating parameters.

Figure 4:
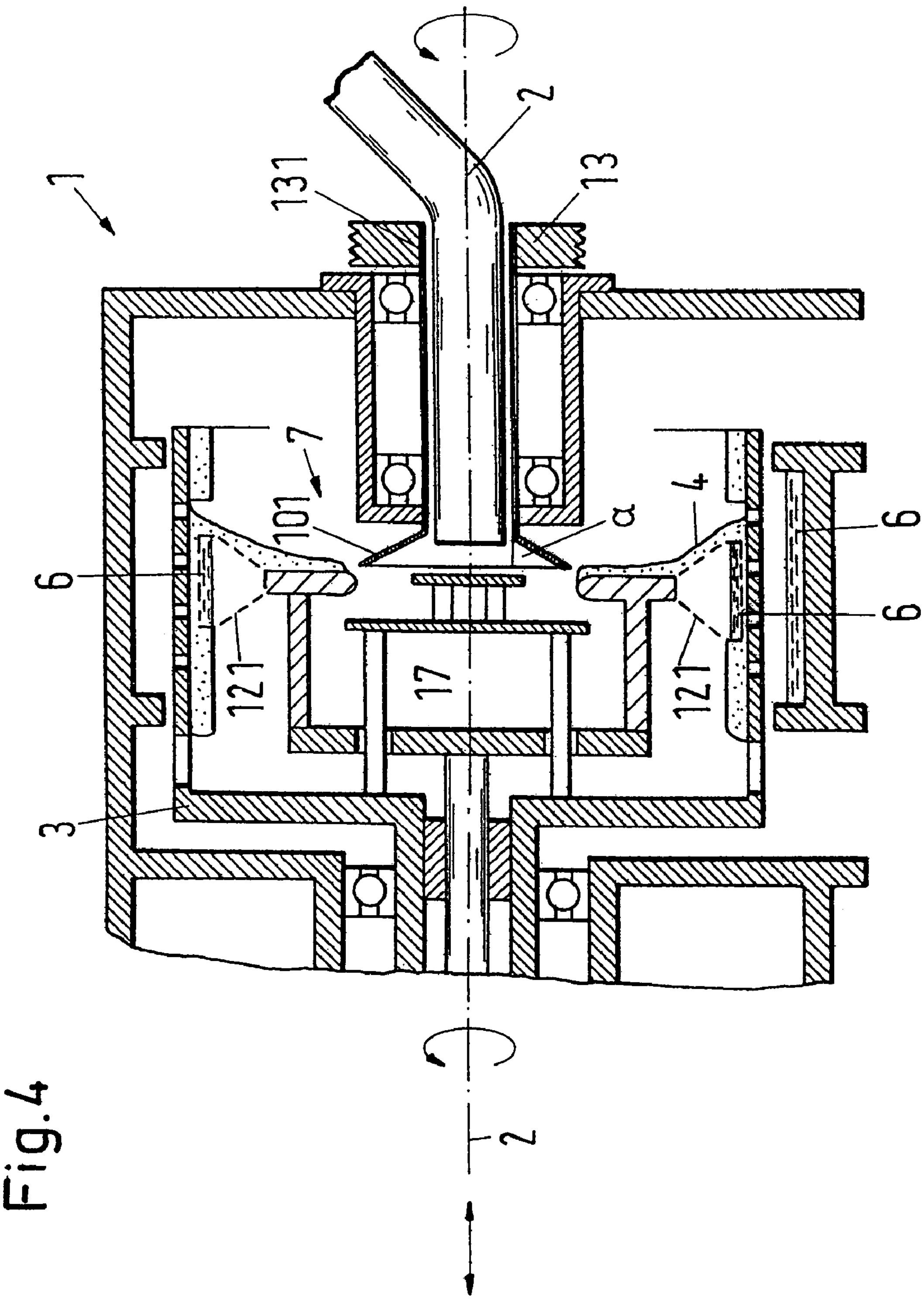
FIG. 4 shows another specific embodiment in accordance with FIG. 3.
Figure 5:
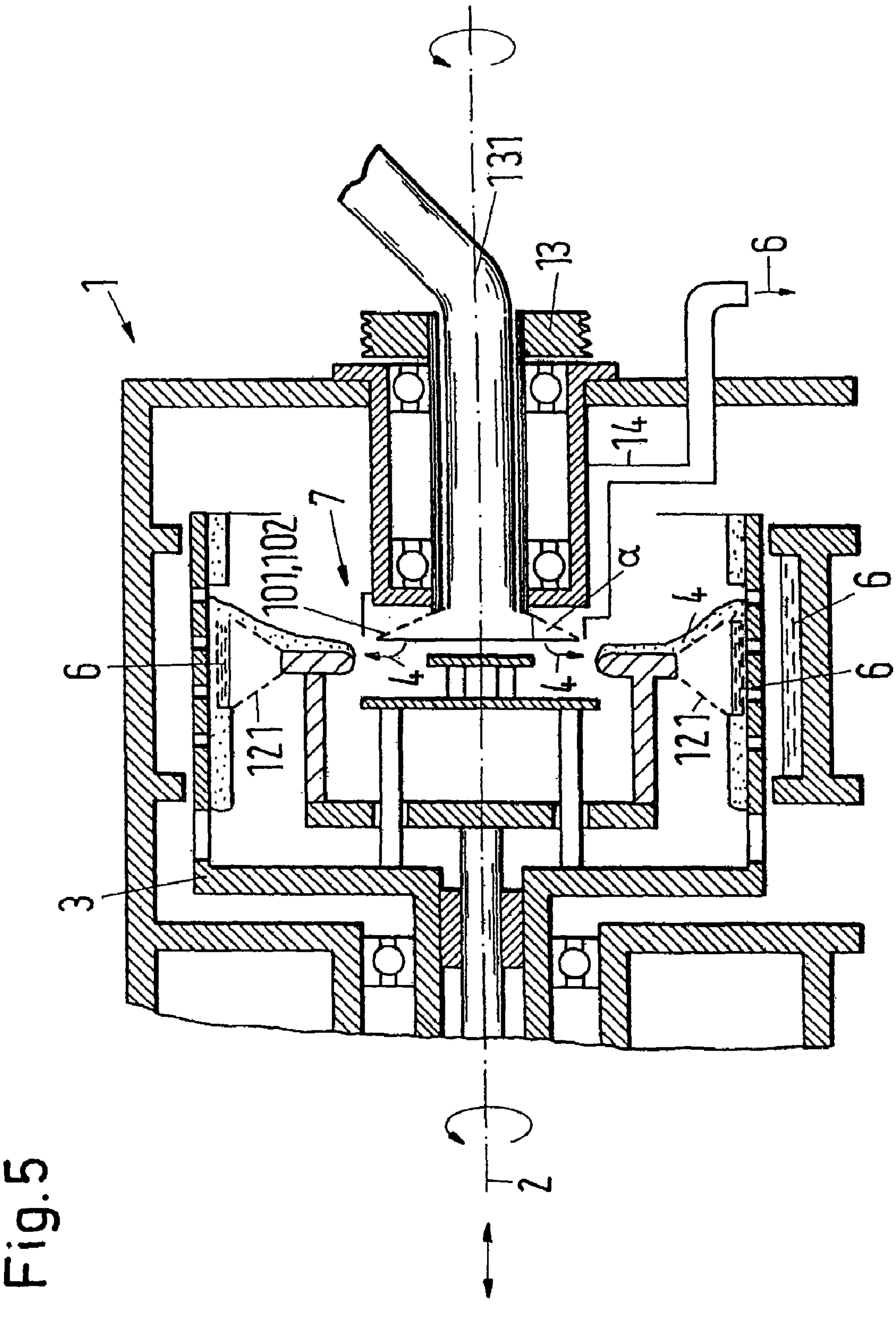
FIG. 5 shows a further specific embodiment in accordance with FIG. 4.

FIG. 5 shows a further particularly advantageous variant in accordance with FIG. 4. In this variant the inlet funnel 10 is designed as a pre-filter screen 102 for initial separation of the liquid phase 6 from the mixture 4. In this arrangement the inlet funnel 101 is designed and arranged in such a way, with reference to a collecting means 14 provided in the screen drum 3, that at least one part of the liquid phase 6 can already be separated out of the mixture 4 into the collecting means 14 through the pre-filter screen 102 and can be drained out of the screen drum 3 during the pre-acceleration of the mixture 4 in the inlet funnel 101. In this way it is also possible to process mixtures with enormously high liquid contents with the double pusher centrifuge in accordance with the invention. In this it is particularly advantageous in practice if a part of the liquid phase 6 is already separated before entry into the mixture distributor 7. This part of the liquid phase 6 is no longer accelerated to the full peripheral speed of the screen drum, which results in a massive energy saving and relieves the components, in particular the rotating and/oscillating components of the double pusher centrifuge 1.

The inlet funnel 101 or the pre-filter screen 102 has an opening angle α with reference to the axis of rotation 2 which can be between 0° and 45° for example, with reference to the axis of rotation 2, individually between 0° and 10° or between 10° and 45°, in particular between 25° and 45°, preferably between 15° and 35°. It goes without saying that in special cases it is also possible that the value of the opening angle α is greater than 45°. As a result, the flow speed of the mixture 4 can be specifically altered in the inlet funnel 101 or in the pre-filter screen 102, in comparison to the speed in free-fall in the direction towards the screen drum 3, so that the mixture 4 can be gradually accelerated in the region of the inlet funnel 101 or of the pre-filter screen 102. This means that the mixture 4 can be accelerated bit by bit in the region of the pre-filter screen 102 up to a pre-determined peripheral speed in a particularly protective manner.

Figure 6:
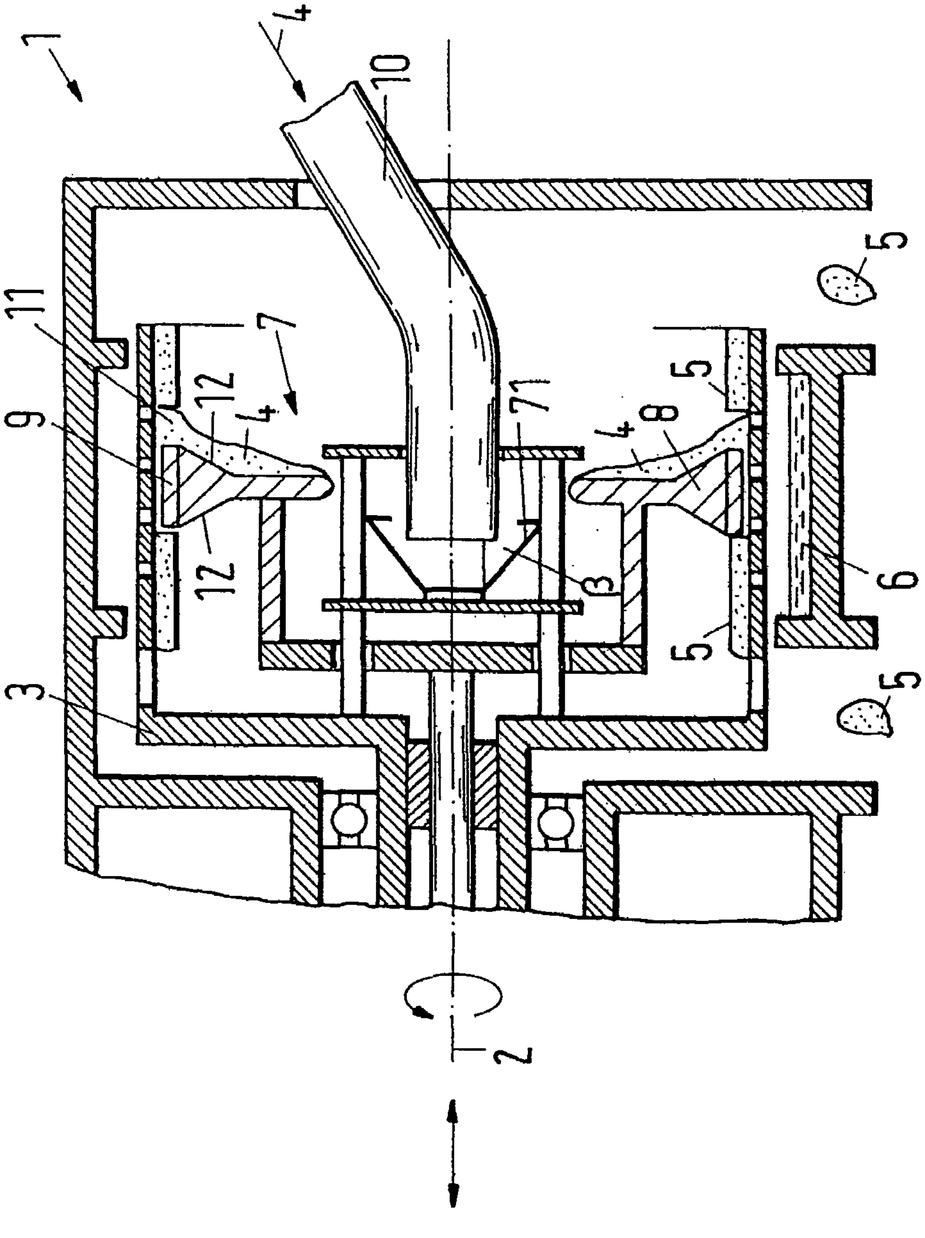
FIG. 6 shows a double pusher centrifuge with pre-acceleration funnel.

FIG. 6 shows a variant of a double pusher centrifuge in accordance with the invention with a pre-acceleration funnel 71. In this variant the pre-acceleration funnel 71 is arranged at the inflow device 17 and rotationally fixedly connected to it. The inlet funnel 101 rotates synchronously with the pusher base device 8. In this arrangement the pre-acceleration funnel 71 extends in an essentially axial direction towards the infeed device 10 so that the mixture 4 fed through the infeed device 10 flows into the pre-acceleration funnel 71 directly. In this arrangement the pre-acceleration funnel 71 is so designed and arranged that, on leaving the pre-acceleration funnel 7, the mixture 4 can be fed into one of the two drum halves via the pusher base device depending on the axial position of the mixture distributor 7.

Due to the fact that the pre-acceleration funnel 71 essentially conically diverges in the direction towards the mixture distributor 7 and that the inlet funnel co-rotates in synchrony, the mixture 4 is initially pre-accelerated in the inlet funnel 101 to a pre-determined speed of rotation so that the mixture 4 already shows a certain speed in the peripheral direction of the screen drum on reaching the acceleration surface 12 and thus altogether can be accelerated even more gently to the maximum peripheral speed of the peripheral surface 20.

Figure 7:
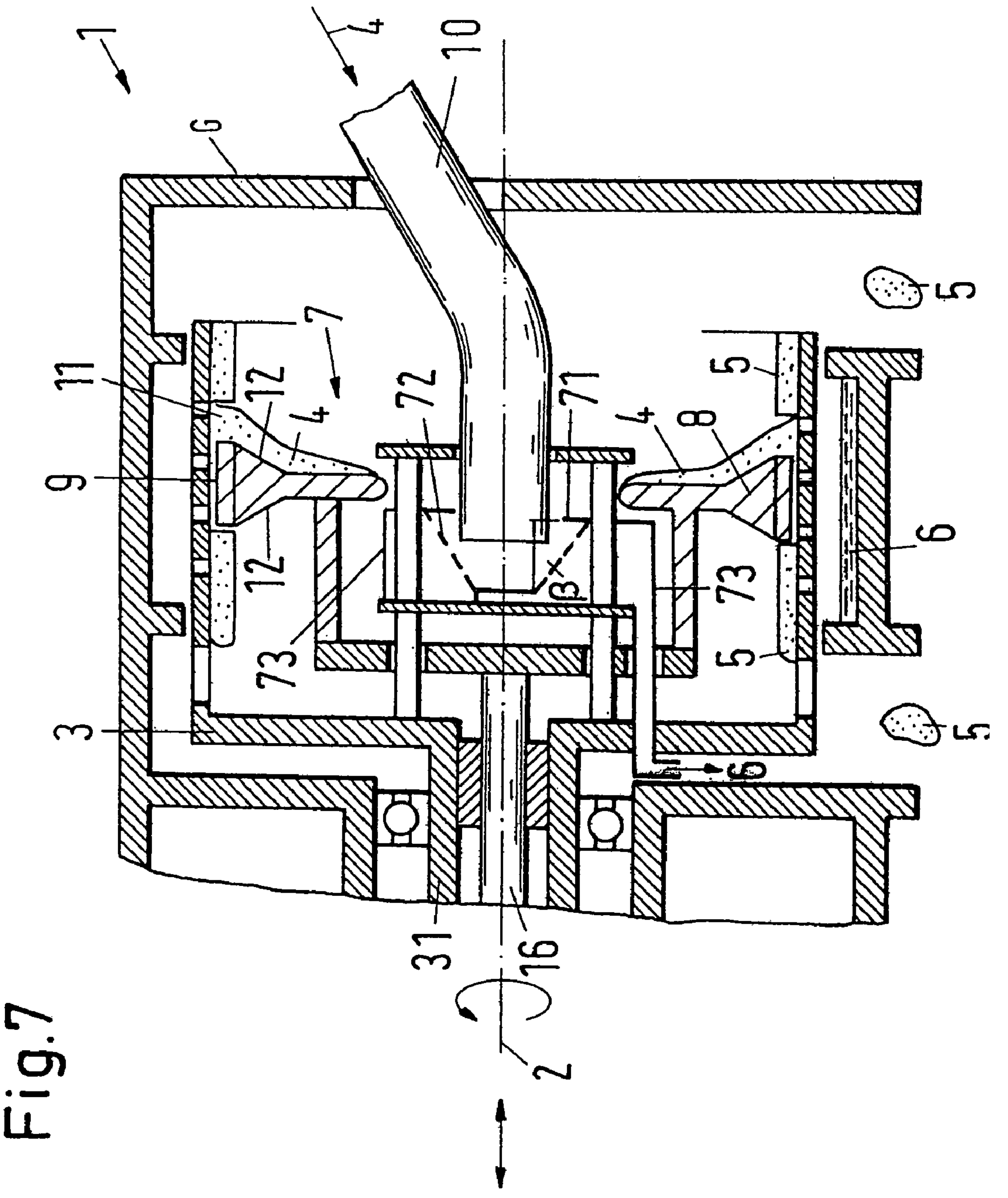
FIG. 7 shows a specific embodiment in accordance with FIG. 6 with pre-acceleration screen.

A further embodiment in accordance with FIG. 6 which is important in practice is illustrated schematically in FIG. 7. In this variant the pre-acceleration funnel 71 is designed as a pre-acceleration screen 72 for initial separation of the liquid phase 6 out of the mixture 4. In this arrangement the pre-acceleration funnel 71 is so designed and arranged, with reference to a collecting means 73 provided in the screen drum 3, that at least one part of the liquid phase 6 can already be separated out of the mixture 4 into the collecting means 73 and can be drained out of the screen drum 3 through the pre-acceleration screen 72 during the pre-acceleration of the mixture 4 in the pre-acceleration funnel 71. In this way it is possible to also process mixtures with enormously high liquid contents with this variant of the double pusher centrifuge 1 in accordance with the invention. In this arrangement it is of particular advantage in practice if one part of the liquid phase 6 is initially separated before entry into the mixture distributor 7. This part of the liquid phase 6 is no longer accelerated to the full peripheral speed of the screen drum 3, which results in a massive saving in energy and relieves the components, in particular the rotating and/or oscillating components of the double pusher centrifuge 1.

The pre-acceleration funnel 71 or the pre-acceleration screen 72 has a pre-acceleration angle β with reference to the axis of rotation 2, which with reference to the axis of rotation 2 can for example lie between 0° and 45°, in individual cases can be between 0° and 10° or between 10° and 45°, in particular between 25° and 45°, can preferably be between 15° and 35°. It goes without saying that in special cases it is also possible for the value of the pre-acceleration angle β to be larger than 45°. In this way the flow speed of the mixture 4 in comparison with the speed in free-fall in the direction towards the screen drum 3 can be altered intentionally in the pre-acceleration screen 72, so that the mixture 4 can be accelerated gradually in the region of the pre-acceleration funnel 71 or of the pre-acceleration screen 72. This means that the mixture 4 can be accelerated in the region of the pre-acceleration screen 72 little by little, in a particularly protective manner to a pre-determined peripheral speed, in order to finally attain the full speed of rotation of the screen drum 3 on reaching the peripheral surface 20 of the screen drum 3.

Figure 7A:
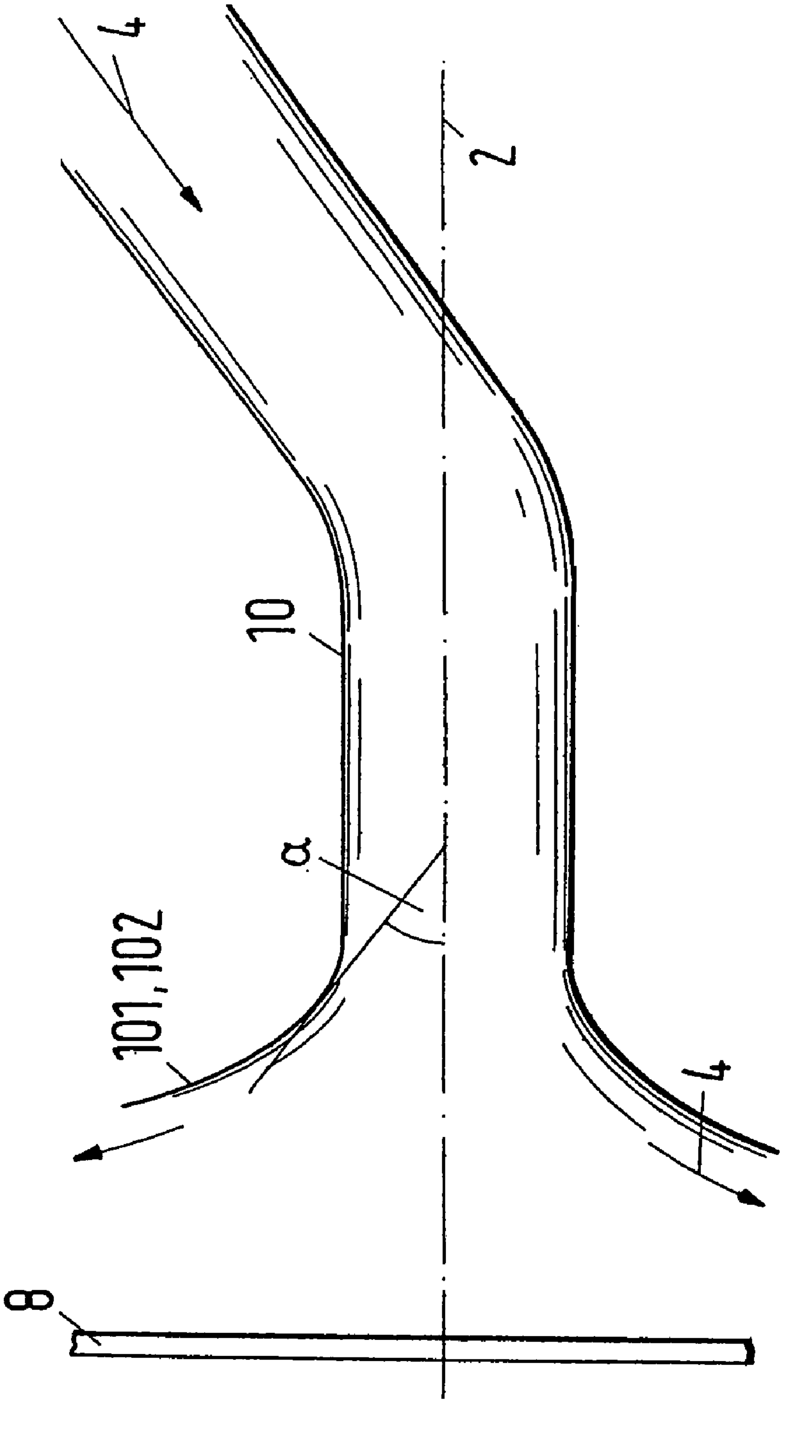
FIG. 7*a* shows an inlet funnel with curved shape.
Figure 7B:
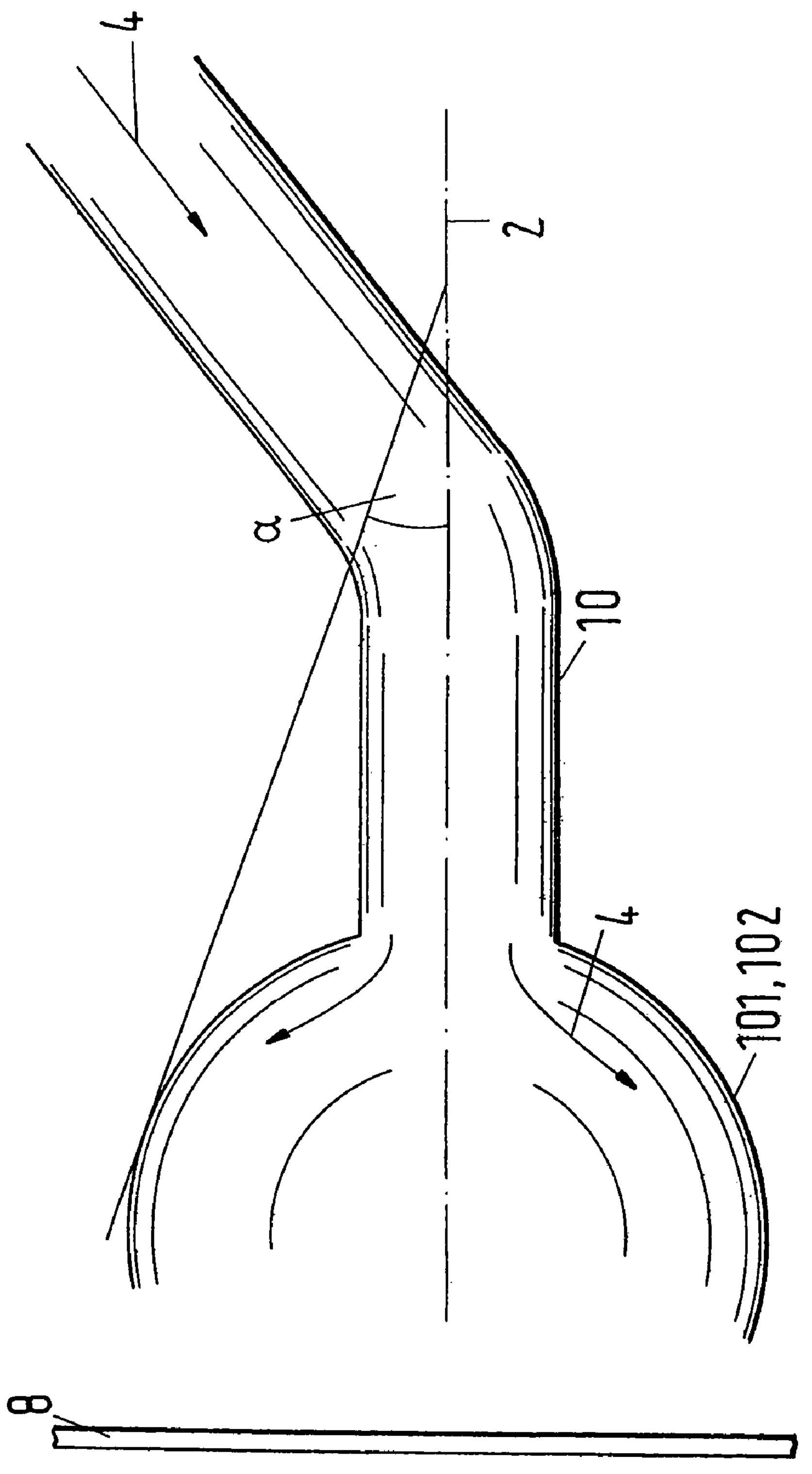
FIG. 7*b* shows another inlet funnel in accordance with FIG. 7*a;*

If, for example, the inlet funnel 101 is formed as a pre-filter screen 102 for initial separation of the liquid phase 6, then it can in particular be of especial advantage, but not only then, if the inlet funnel 101 or the pre-filter screen 102 has a curved shape and the opening angle α of the inlet funnel 101 becomes larger or smaller in the direction towards the pusher base device, as illustrated schematically in FIGS. 7*a* and 7*b*. It is known that different mixtures 4 can be dewatered with differing degrees of success under otherwise identical operating conditions of the double pusher centrifuge 1, depending on the particle size and/or the viscosity for example and/or other characteristics or parameters, such as for example the temperature of the mixture 4.

If, for example, there is a mixture 4, which is relatively easy to dewater under given operating parameters, it can be to advantage that the inlet funnel 101 or the pre-filter screen 102 is of curved shape, with the opening angle α of the pre-filter screen 102 becoming larger in the direction towards the pusher base device 8. A special embodiment of this kind of an inlet funnel 101 is illustrated schematically in FIG. 7*a*. This means that the inlet funnel 101 or the pre-filter screen 102 become larger in the direction towards the pusher base device 8, rather like the horn of a trumpet. Thus the drive force, with which the mixture 4 is accelerated out of the inlet funnel 101, becomes disproportionately larger, with reducing distance from the pusher base device 8, so that the mixture 4, which can already be relatively well dewatered in the pre-filter screen 102 and thus shows poor sliding characteristics in the pre-filter screen 102, can leave the pre-filter screen 102 more quickly than, for example, an essentially conical pre-filter screen 102 which becomes larger at a constant opening angle α.

On the other hand mixtures 4 can also be present which are relatively difficult to dewater under given operating parameters. In this case it is recommended to use an inlet funnel 101 or a pre-filter screen 10 which has a curved shape, with the opening angle α of the pre-filter screen 102 becoming smaller in the direction towards the pusher base device 8. This has the result that the centrifugal force with which the mixture 4 is accelerated out of the inlet funnel 101 increases more slowly with increased proximity to the pusher base device than, for example, an inlet funnel 101 which becomes conically larger at an essentially constant opening angle α. Due to this a certain dam or stagnation effect arises in the pre-filter screen 102, so that the mixture 4 remains in the pre-filter screen 102 for a longer time and thus can be initially dewatered in the pre-filter screen 102 to a higher degree.

Completely analogously to the aforesaid, the pre-acceleration funnel 71 or the pre-acceleration screen 72 can of course be of curved shape, with the pre-acceleration angle β of the pre-acceleration funnel 71 becoming larger or smaller in the direction of the infeed device 10.

Figure 8:
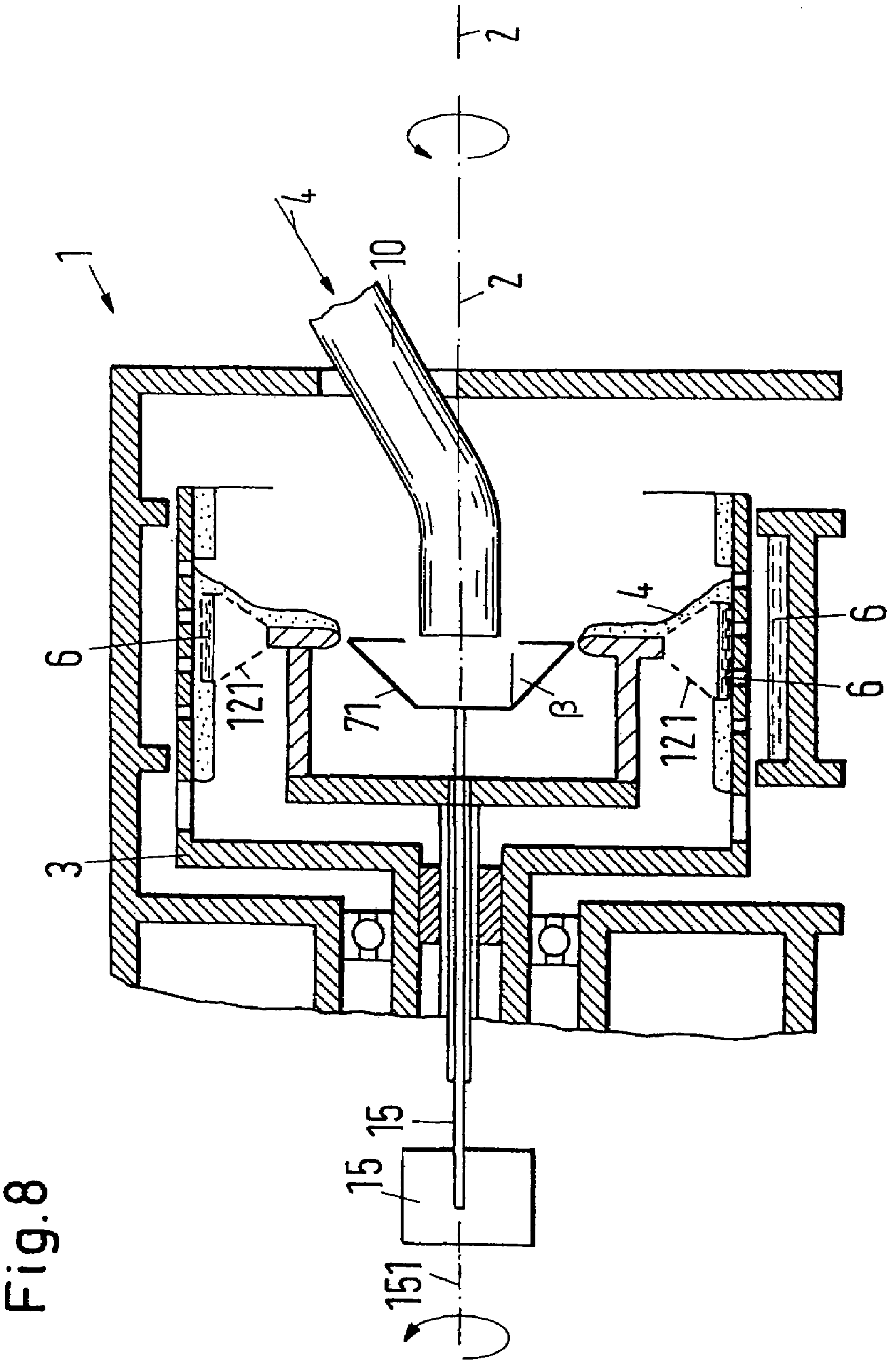
FIG. 8 shows a pre-acceleration funnel with rotary drive.

It is of course also possible, as illustrated schematically in FIG. 8, that the pre-acceleration funnel 71 is so designed and arranged that the pre-acceleration funnel 71 can be rotated by means of a rotary drive 15 about an axis of rotation 151 at a pre-determined speed of rotation. In this arrangement the axis of rotation 151, as shown by way of example in FIG. 8, can be arranged inside the axis of rotation 2 and can be driven independent of this by the rotary drive 15. For control and/or regulation of the speed of rotation of the rotary drive 15, suitable means, not shown here, can be provided to control and/or regulate the rotary drive 15, depending on suitable operating parameters of the double pusher centrifuge 1 for example.

It goes without saying that it is also possible, with the variant shown in FIG. 8, completely analogously to the embodiment discussed in FIG. 5, that the pre-acceleration funnel 71 is provided as a pre-acceleration screen for the initial separation of the liquid phase 6 and, moreover, that suitable collecting means are provided for leading away the liquid phase 6 separated at the pre-acceleration screen.

Furthermore, it is clear that the variants explained above and illustrated schematically in the drawings can also be combined with one another quite arbitrarily for further embodiments, in order to meet special requirements in practical use.

By the use of the double pusher centrifuge in accordance with the invention the mixture which has been brought in can be pre-accelerated to a pre-determinable peripheral speed by the acceleration surfaces arranged on both sides of the pusher base device so that on reaching the screen drum the mixture is not accelerated from a peripheral speed close to zero up to the full peripheral speed of the screen drum in the shortest possible time. In this way grain breakage is avoidable, among other things, so that in particular also substances which react in a particularly sensitive manner to abrupt alterations of a centrifugal acceleration can be processed, while satisfying the highest demands regarding quality.

In the various preferred embodiments extremely low inflow concentrations can furthermore also be processed which correspond to 50% or 70% or 80% or even more than 90% proportion of liquid phase. By means of the filter screen and/or the pre-filter screen and/or the pre-acceleration screen it is possible to process mixtures with an almost arbitrarily large liquid content, without the mixture having to be concentrated in a complicated process. Thus, even with a high liquid content, it is always guaranteed that an even distribution of the mixture to be dried takes place across the inner peripheral surface of the screen drum. Thus, on the one hand, very damaging vibrations of the screen drum and with this the premature wear on bearings and drive are prevented and safety problems in operation are effectively prevented. Furthermore, problems while washing the solid material cake due to its irregular distribution over the peripheral surface of the screen drum are largely avoided. The use of pre-dewatering systems, which are costly and complicated to use from a technical method viewpoint or apparatus-wise, is likewise avoided which naturally results in considerable savings in operation.

When using the filter systems named above the entire amount of the liquid phase which is added with the mixture no longer has to be accelerated to the full peripheral speed of the screen drum. This is extremely positive, especially with a view to energy consumption of the double pusher centrifuge, and has, as a whole, a clearly positive influence on the operating behavior of the centrifuge.

It is even possible, with a corresponding different design of the various filter surfaces, or by the use of the inlet funnel and/or of a pre-acceleration funnel with its own drive, to manufacture two different solid material cakes of different quality i.e. with different characteristics in one and the same double pusher centrifuge and in one and the same operating step.

The invention claimed is:

1. A double pusher centrifuge including a screen drum rotatable about an axis of rotation for separating a mixture into a solid material cake and a liquid phase, a mixture distributor arranged in the screen drum and having a pusher base device, which is arranged to be movable to and fro along the axis of rotation, so that the solid material cake is alternately displaceable with an outer ring zone, and with an infeed device with which the mixture can be introduced via the mixture distributor into an empty space, which arises adjacent to the outer ring zone on displacement of the solid material cake by the pusher base device, the pusher base device having acceleration surfaces on both sides, which are inclined at a pre-determinable angle of inclination with reference to the radial direction, so that the mixture introduced by the infeed device can be accelerated to a pre-determinable peripheral speed before reaching the screen drum, and wherein the infeed device includes an inlet funnel for pre-acceleration of the mixture which extends at a substantially constant opening angle conically diverging in the direction towards the pusher base device.

2. A double pusher centrifuge in accordance with claim 1, wherein the acceleration surface is designed as a filter screen for separating the liquid phase from the mixture.

3. A double pusher centrifuge in accordance with claim 2 wherein the filter screen is designed as a two-stage screen with a coarse filter and a fine filter.

4. A double pusher centrifuge in accordance with claim 1, wherein the inlet funnel has a curved shape and the opening angle of the inlet funnel becomes larger in the direction towards the pusher base device.

5. A double pusher centrifuge in accordance with claim 1, wherein the inlet funnel has a curved shape and the opening angle of the inlet funnel becomes smaller in the direction towards the pusher base device.

6. A double pusher centrifuge in accordance with claim 1, wherein the inlet funnel is rotatably arranged about a drive axis and is rotatable about the drive axis at a pre-determinable speed of rotation by means of a drive.

7. A double pusher centrifuge in accordance with claim 1, wherein the inlet funnel is designed as a pre-filter screen for the initial separation of the liquid phase from the mixture.

8. A double pusher centrifuge in accordance with claim 7, wherein collecting means are provided for collecting and draining the liquid phase from the pre-filter screen.

9. A double pusher centrifuge in accordance with claim 1, in which the mixture distributor includes a pre-acceleration funnel, which extends in the direction towards the infeed device while conically diverging at an essentially constant pre-acceleration angle.

10. A double pusher centrifuge in accordance with claim 1, wherein the mixture distributor includes a pre-acceleration funnel that is rotatable about an axis of rotation by means of a rotary drive at a pre-determinable speed of rotation.

11. A double pusher centrifuge including a screen drum rotatable about an axis of rotation for separating a mixture into a solid material cake and a liquid phase, a mixture distributor arranged in the screen drum and having a pusher base device, which is arranged to be movable to and fro along the axis of rotation, so that the solid material cake is alternately displaceable with an outer ring zone, and with an infeed device with which the mixture can be introduced via the mixture distributor into an empty space, which arises adjacent to the outer ring zone on displacement of the solid material cake by the pusher base device, the pusher base device having acceleration surfaces on both sides, which are inclined at a pre-determinable angle of inclination with reference to the radial direction, so that the mixture introduced by the infeed device can be accelerated to a pre-determinable peripheral speed before reaching the screen drum, and wherein the infeed device includes an inlet funnel which has a curved shape, an opening angle of the inlet funnel becoming one of larger and smaller in the direction towards the pusher base device.

12. A double pusher centrifuge in accordance with claim 11, wherein the infeed device includes an inlet funnel for pre-acceleration of the mixture which extends at a substantially constant opening angle conically diverging in the direction towards the pusher base device.

13. A double pusher centrifuge including a screen drum rotatable about an axis of rotation for separating a mixture into a solid material cake and a liquid phase, a mixture distributor arranged in the screen drum and having a pusher base device, which is arranged to be movable to and fro along the axis of rotation, so that the solid material cake is alternately displaceable with an outer ring zone, and with an infeed device with which the mixture can be introduced via the mixture distributor into an empty space, which arises adjacent to the outer ring zone on displacement of the solid material cake by the pusher base device, the pusher base device having acceleration surfaces on both sides, which are inclined at a pre-determinable angle of inclination with reference to the radial direction, so that the mixture introduced by the infeed device can be accelerated to a pre-determinable peripheral speed before reaching the screen drum, and wherein the mixture distributor includes a pre-acceleration funnel that has a curved shape and a pre-acceleration angle of the pre-acceleration funnel extending towards the infeed device becoming one of larger and smaller in the direction towards the infeed device.

14. A double pusher centrifuge in accordance with claim 13, wherein the pre-acceleration funnel has a curved shape and a pre-acceleration angle of the pre-acceleration funnel becomes larger in the direction towards the infeed device.

15. A double pusher centrifuge in accordance with claim 13, wherein the pre-acceleration funnel has a curved shape and a pre-acceleration angle of the pre-acceleration funnel becomes smaller in the direction towards the infeed device.

16. A double pusher centrifuge in accordance with claim 13, wherein the pre-acceleration funnel is designed as a pre-acceleration screen and collection devices are provided at the mixture distributor draining the liquid phase.

17. A double pusher centrifuge including a screen drum rotatable about an axis of rotation for separating a mixture into a solid material cake and a liquid phase, a mixture distributor arranged in the screen drum and having a pusher base device, which is arranged to be movable to and fro along the axis of rotation, so that the solid material cake is alternately displaceable with an outer ring zone, and with an infeed device with which the mixture can be introduced via the mixture distributor into an empty space, which arises adjacent to the outer ring zone on displacement of the solid material cake by the pusher base device, the pusher base device having acceleration surfaces on both sides, which are inclined at a pre-determinable angle of inclination with reference to the radial direction, so that the mixture introduced by the infeed device can be accelerated to a pre-determinable peripheral speed before reaching the screen drum, and wherein the mixture distributor includes a pre-acceleration funnel which is rotatable about an axis of rotation by means of a rotary drive at a pre-determinable speed of rotation.

* * * * *